(12) United States Patent
Inada

(10) Patent No.: US 8,131,161 B2
(45) Date of Patent: Mar. 6, 2012

(54) DPSK OPTICAL RECEIVER

(75) Inventor: Yoshihisa Inada, Tokyo (JP)

(73) Assignee: NEC Corporation, Tokyo (JP)

( * ) Notice: Subject to any disclaimer, the term of this patent is extended or adjusted under 35 U.S.C. 154(b) by 919 days.

(21) Appl. No.: 12/109,526

(22) Filed: Apr. 25, 2008

(65) Prior Publication Data

US 2009/0317093 A1    Dec. 24, 2009

(30) Foreign Application Priority Data

Apr. 25, 2007  (JP) .................................. 2007-115361

(51) Int. Cl.
*H04B 10/06*    (2006.01)
*H04B 10/12*    (2006.01)

(52) U.S. Cl. ........ 398/213; 398/208; 398/209; 398/212; 398/214

(58) Field of Classification Search .......... 398/202–214; 359/325
See application file for complete search history.

(56) References Cited

U.S. PATENT DOCUMENTS

| | | | | |
|---|---|---|---|---|
| 5,864,414 | A * | 1/1999 | Barnsley et al. ................. | 398/71 |
| 6,469,817 | B1 | 10/2002 | Heflinger | |
| 7,158,722 | B1 * | 1/2007 | Frigo et al. ...................... | 398/30 |
| 7,187,861 | B2 * | 3/2007 | Ruchet .............................. | 398/9 |
| 2005/0088659 | A1 | 4/2005 | Schlenk et al. | |
| 2005/0100281 | A1 | 5/2005 | Kim et al. | |
| 2005/0286908 | A1 * | 12/2005 | Way ................................ | 398/186 |
| 2006/0072927 | A1 | 4/2006 | Kim et al. | |
| 2006/0120733 | A1 * | 6/2006 | Tucker et al. .................. | 398/204 |
| 2006/0139735 | A1 * | 6/2006 | Caplan ............................ | 359/325 |
| 2006/0147218 | A1 | 7/2006 | Domagala | |
| 2006/0171720 | A1 * | 8/2006 | Agarwal et al. ................ | 398/186 |

FOREIGN PATENT DOCUMENTS

| | | |
|---|---|---|
| EP | 1675281 A1 | 6/2006 |
| JP | 2006217605 A | 8/2006 |

OTHER PUBLICATIONS

European Search Report for EP Application No. 08103733.5 completed Jul. 29, 2008.

* cited by examiner

*Primary Examiner* — Kenneth N Vanderpuye
*Assistant Examiner* — Daniel Dobson

(57)    ABSTRACT

A DPSK optical receiver includes a DPSK demodulation circuit, an optical bandpass filter, a first photodetector, and a first control circuit. The DPSK demodulation circuit demodulates a DPSK optical signal and outputs the DPSK demodulated optical signal. The optical bandpass filter extracts a demodulated optical signal near the center wavelength from the DPSK demodulated optical signal output from the DPSK demodulation circuit. The first photodetector detects the optical power level of the DPSK demodulated optical signal extracted by the optical bandpass filter. The first control circuit performs phase control on the DPSK demodulation circuit so as to optimize the DPSK demodulation circuit with respect to the center wavelength of the DPSK optical signal on the basis of the optical power level detected by the first photodetector.

4 Claims, 10 Drawing Sheets

US 8,131,161 B2

DPSK OPTICAL RECEIVER

This application is based upon and claims the benefit of priority from Japanese patent application No. 2007-115361, filed on Apr. 25, 2007, the disclosure of which is incorporated herein in its entirety by reference.

BACKGROUND OF THE INVENTION

The present invention relates to an optical receiver used in an optical transmission system based on a DPSK (Differential-Phase-Shift-Keying) modulation scheme.

A modulation scheme with high reception sensitivity is effective in obtaining good signal quality in an optical fiber transmission system. DPSK modulation is one of modulation schemes exhibiting high reception sensitivity because of their unique demodulation schemes. This modulation scheme can achieve an improvement in reception sensitivity by about 3 dB as compared with a general On-Off-keying scheme such as an NRZ (Non Return to Zero) or RZ (Return to Zero) scheme. DPSK modulation is disclosed in, for example, Japanese Patent Laid-Open No. 2006-217605.

A DPSK demodulation circuit in a DPSK receiver has a problem that since it sensitively reacts to the center frequency of an input DPSK optical signal, the reception characteristic greatly deteriorates due to a slight wavelength shift.

SUMMARY OF THE INVENTION

The present invention has been made to solve the above problem, and has as its object to provide a DPSK optical receiver which can automatically perform optimal control on a DPSK demodulation circuit in accordance with the center wavelength of an input DPSK optical signal.

According to the present invention, there is provided a DPSK optical receiver comprising a DPSK demodulation circuit which demodulates a DPSK optical signal and outputs the DPSK demodulated optical signal, an optical bandpass filter which extracts a demodulated optical signal near a center wavelength from the DPSK demodulated optical signal output from the DPSK demodulation circuit, a first photodetector which detects an optical power level of the DPSK demodulated optical signal extracted by the optical bandpass filter, and a first control circuit which performs phase control on the DPSK demodulation circuit so as to optimize the DPSK demodulation circuit with respect to the center wavelength of the DPSK optical signal on the basis of the optical power level detected by the first photodetector.

DESCRIPTION OF THE PREFERRED EXEMPLARY EMBODIMENT

First Exemplary Embodiment

Figure 1:
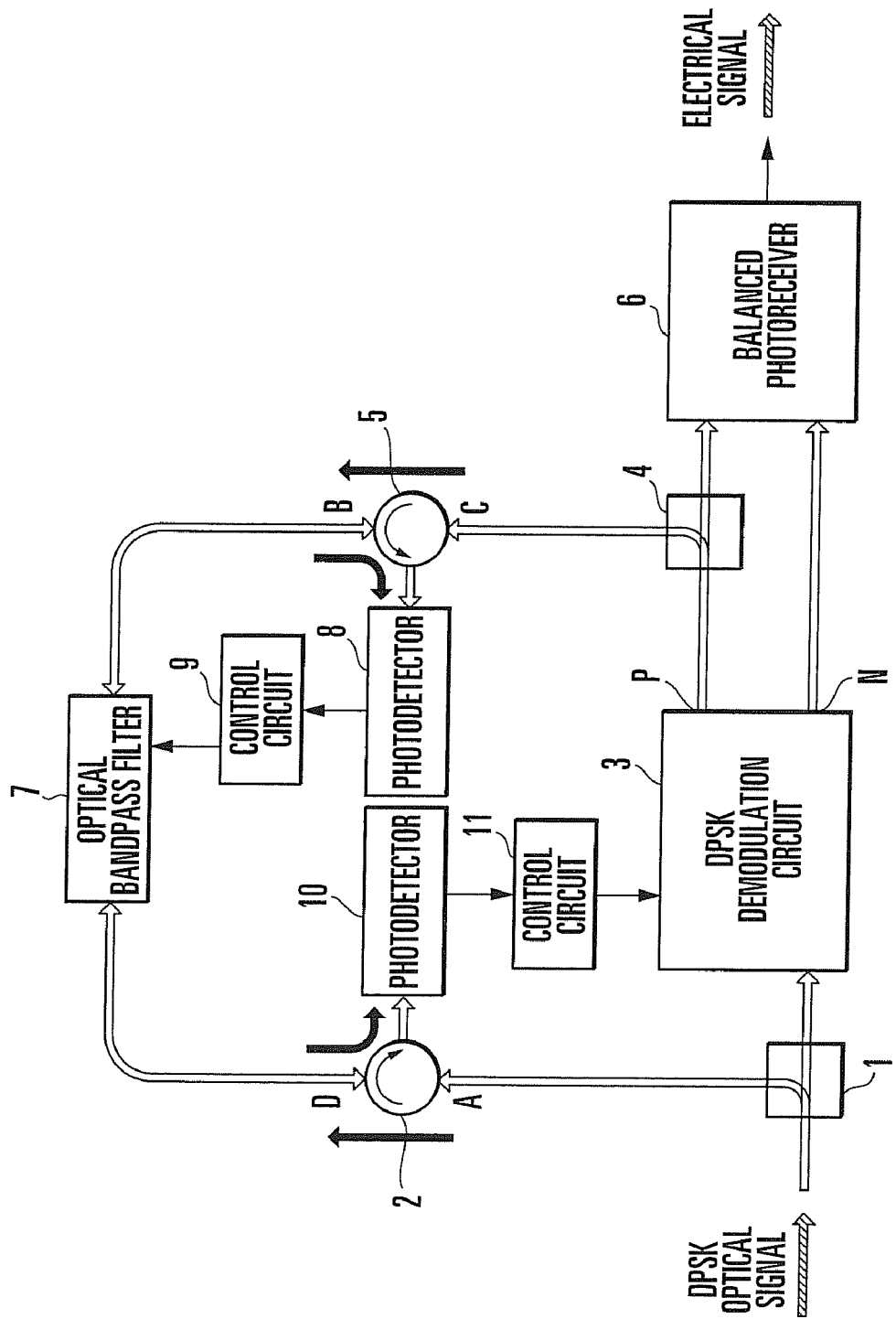
FIG. 1 is a block diagram showing the arrangement of a DPSK optical receiver according to the first exemplary embodiment of the present invention.
Figure 2A:
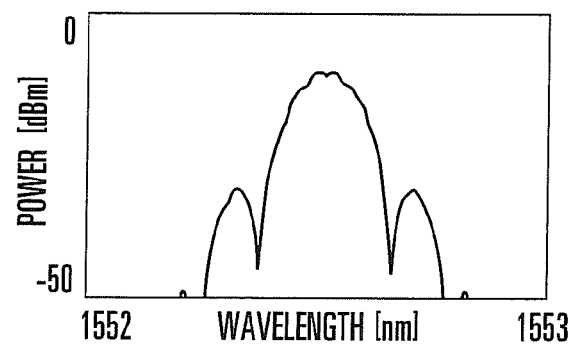
FIGS. 2A to 2D are graphs for explaining a filtering method using the optical spectrum of a DPSK optical signal and an optical bandpass filter in the DPSK optical receiver in FIG. 1.
Figure 2B:
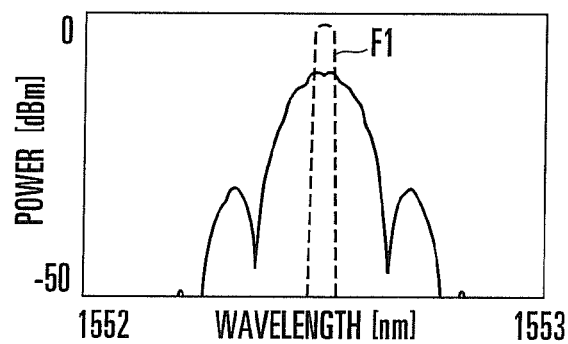
Figure 2C:
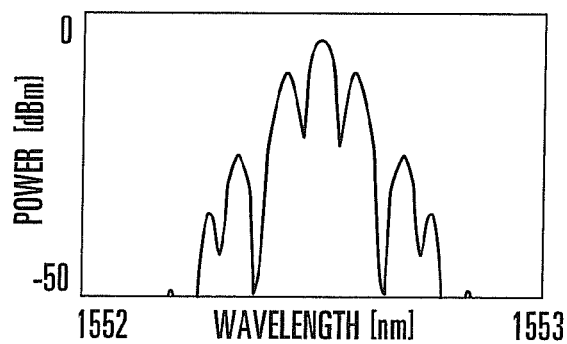
Figure 2D:
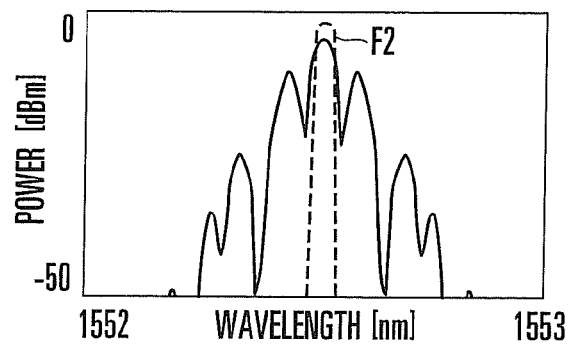

The exemplary embodiments of the present invention will be described below. FIG. 1 shows the arrangement of a DPSK optical receiver according to the first exemplary embodiment of the present invention.

The DPSK optical receiver comprises a photocoupler 1, an optical circulator 2, a DPSK demodulation circuit (DPSK demodulation means) 3, a photocoupler (optical branching means) 4, an optical circulator 5, a balanced photoreceiver 6, an optical bandpass filter (optical extraction means) 7, a second photodetector (second photodetection means) 8, a second control circuit (second control means) 9, a first photodetector (first photodetection means) 10, and a first control circuit (first control means) 11. The photocoupler 1 branches part of a DPSK optical signal modulated by the DPSK modulation scheme. The optical circulator 2 separates a DPSK optical signal from the photocoupler 1 from a DPSK demodulated optical signal from the optical bandpass filter 7. The DPSK demodulation circuit 3 demodulates a DPSK optical signal. The photocoupler 4 branches part of the DPSK demodulated optical signal output from the DPSK demodulation circuit 3. The optical circulator 5 separates the DPSK demodulated optical signal from the photocoupler 4 from the DPSK optical signal from the optical bandpass filter 7. The balanced photoreceiver 6 receives the DPSK demodulated optical signal output from the DPSK demodulation circuit 3. The optical bandpass filter 7 extracts an optical signal near the center wavelength from a DPSK optical signal and also extracts a demodulated optical signal near the center wavelength from a DPSK demodulated optical signal. The second photodetector 8 detects the optical power level of the DPSK optical signal extracted by the optical bandpass filter 7. The second control circuit 9 controls the center wavelength of the optical bandpass filter 7. The first photodetector 10 detects the optical power level of the DPSK demodulated optical signal extracted by the optical bandpass filter 7. The first control circuit 11 performs phase control on the DPSK demodulation circuit 3.

FIGS. 2A to 2D explain a filtering method using the optical spectrum of a DPSK optical signal and the optical bandpass filter 7 in the DPSK optical receiver according to this exemplary embodiment. FIGS. 2A, 2B, 2C, and 2D respectively show the optical spectra of DPSK optical signals at points A, B, C, and D in FIG. 1. FIGS. 2A to 2D respectively show changes in the optical spectrum of the RZ-DPSK optical signal obtained by superimposing RZ modulation on a DPSK optical signal. The operation of the DPSK optical receiver according to this exemplary embodiment will be described below with reference to FIGS. 2A to 2D.

Part of the DPSK optical signal applied to the DPSK optical receiver is branched by the photocoupler 1 and applied to the optical circulator 2. The remaining part of the DPSK optical signal is applied to the DPSK demodulation circuit 3. The optical circulator 2 applies the DPSK optical signal from the photocoupler 1 to the optical bandpass filter 7. The optical spectrum of the DPSK optical signal applied to the optical circulator 2 becomes the one shown in FIG. 2A. The optical bandpass filter 7 filters this signal in accordance with the center wavelength of the DPSK optical signal as indicated by a dotted line F1 in FIG. 2B to extract part of the optical signal (i.e., extract only the optical signal within the dotted line F1).

The DPSK optical signal filtered by the optical bandpass filter 7 is applied to the optical circulator 5. The optical circulator 5 applies the DPSK optical signal from the optical bandpass filter 7 to the photodetector 8. The photodetector 8 detects the optical power level of the applied DPSK optical signal. The control circuit 9 controls the center wavelength of the optical bandpass filter 7 so as to maximize the optical power level detected by the photodetector 8. This can make the center wavelength of the DPSK optical signal applied to the DPSK optical receiver accurately coincide with the center wavelength of the optical bandpass filter 7.

The DPSK demodulation circuit 3 demodulates the DPSK optical signal applied from the photocoupler 1 to the DPSK demodulation circuit 3 and outputs the demodulated signals of positive logic and negative logic (inverted logic) from output ports P and N, respectively. Part of the DPSK optical demodulated signal output from the output port P is branched by the photocoupler 4 and applied to the optical circulator 5. The remaining part of the DPSK optical demodulated signal is applied to the positive logic port of the balanced photoreceiver 6. The DPSK demodulated optical signal of negative logic output from the output port N is directly applied to the negative logic port of the balanced photoreceiver 6.

The optical circulator 5 applies the DPSK demodulated optical signal from the photocoupler 4 to the optical bandpass filter 7. The optical spectrum of the DPSK optical signal applied from the photocoupler 4 to the optical circulator 5 becomes the one shown in FIG. 2C. The optical bandpass filter 7 filters this signal in accordance with the center wavelength of the DPSK demodulated optical signal as indicated by a dotted line F2 in FIG. 2D to extract part of the demodulated optical signal (i.e., extract only the optical signal within the dotted line F2).

The DPSK demodulated optical signal filtered by the optical bandpass filter 7 is applied to the optical circulator 2. The optical circulator 2 applies the DPSK demodulated optical signal from the optical bandpass filter 7 to the first photodetector 10. The photodetector 10 detects the optical power level of the applied DPSK demodulated optical signal. The control circuit 11 executes phase control on the DPSK demodulation circuit 3 so as to maximize the optical power level detected by the photodetector 10, thereby locking the DPSK demodulation circuit 3 to the center wavelength of the DPSK optical signal applied to the DPSK demodulation circuit 3. This arrangement can maximize the eye opening of the DPSK demodulated optical signal and avoid a data polarity error at the time of DPSK demodulation. This can greatly improve transmission quality degradation accompanying the wavelength shift between the center wavelength of the DPSK optical signal and the DPSK demodulation circuit 3.

The balanced photoreceiver 6 converts the DPSK demodulated optical signal of positive logic applied from the photocoupler 4 into an electrical signal. Likewise, the balanced photoreceiver 6 converts the DPSK demodulated optical signal output of negative logic from the output port N of the DPSK demodulation circuit 3 into an electrical signal.

In the DPSK optical receiver, the demodulated waveform of a signal from the DPSK demodulation circuit sensitively changes with a change in the wavelength of an applied DPSK optical signal. For this reason, the DPSK demodulation circuit 3 needs to use a control scheme dynamically following up the center wavelength of a DPSK optical signal. In order to implement such control, it is necessary to use two circuits, i.e., a circuit for detecting the center wavelength of a DPSK optical signal and a circuit for controlling the DPSK demodulation circuit 3 in accordance with the detected center wavelength. This exemplary embodiment comprises these two functions.

Figure 3A:
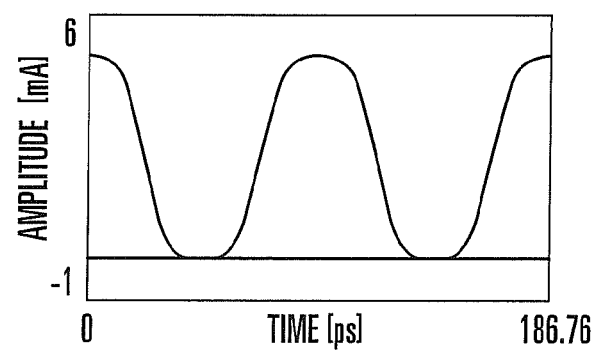
FIGS. 3A to 3D are graphs showing the optical waveform and optical spectrum of a DPSK demodulated optical signal output from a DPSK demodulation circuit when the DPSK demodulation circuit is optimized with respect to the center wavelength of a DPSK optical signal.
Figure 3B:
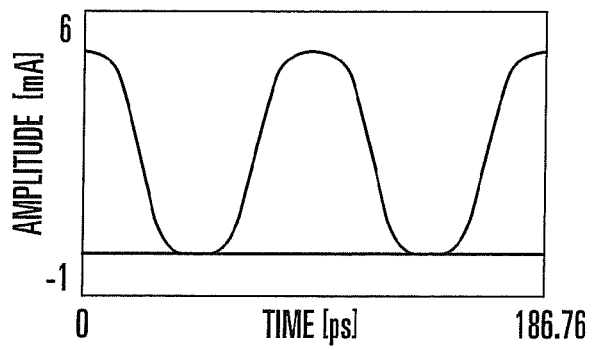
Figure 3C:
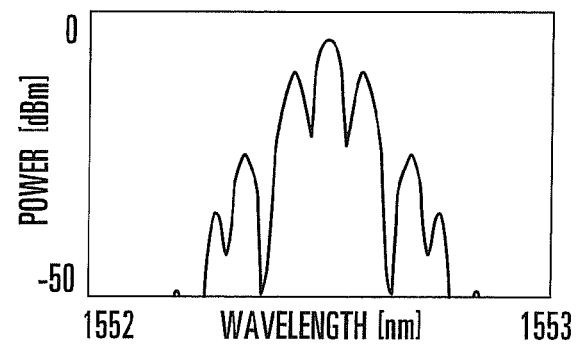
Figure 3D:
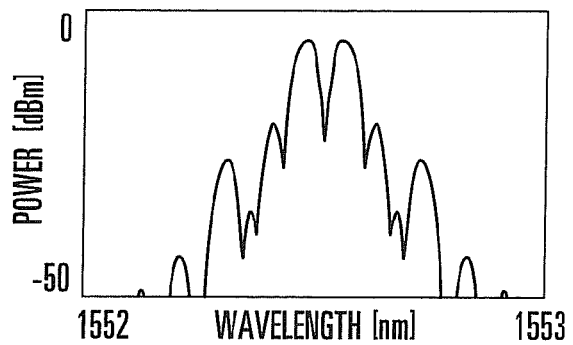

FIGS. 3A to 3D show the optical waveform and optical spectrum of a DPSK demodulated optical signal output from the DPSK demodulation circuit 3 when the DPSK demodulation circuit 3 is optimized with respect to the center wavelength of a DPSK optical signal. FIG. 3A shows the optical waveform of the DPSK demodulated optical signal output from the output port P of the DPSK demodulation circuit 3. FIG. 3B shows the optical waveform of the DPSK demodulated optical signal output from the output port N of the DPSK demodulation circuit 3. FIG. 3C shows the optical spectrum of the DPSK demodulated optical signal output from the output port P. FIG. 3D shows the optical spectrum of the DPSK demodulated optical signal output from the output port N.

Figure 4A:
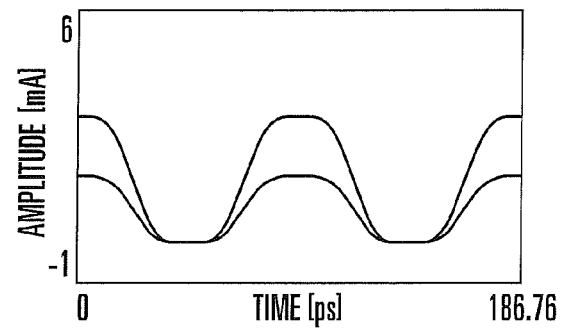
FIGS. 4A to 4D are graphs showing the optical waveform and optical spectrum of a DPSK demodulated optical signal output from the DPSK demodulation circuit when the center wavelength of the DPSK optical signal deviates from an optimal state.
Figure 4B:
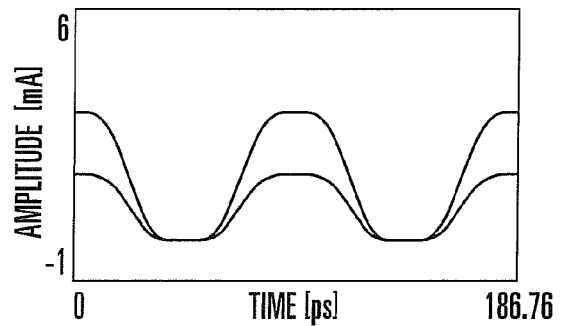
Figure 4C:
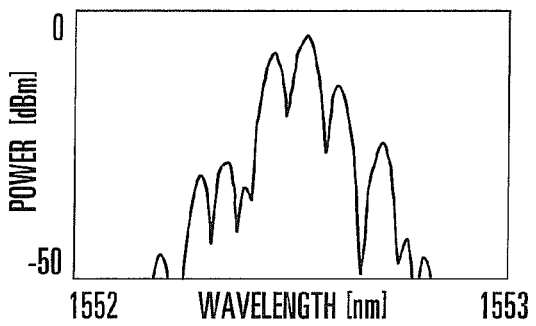
Figure 4D:
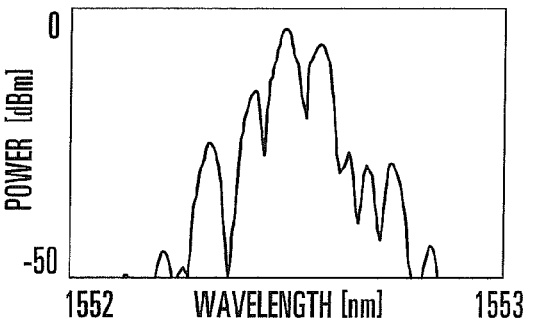

FIGS. 4A to 4D show the optical waveform and optical spectrum of a DPSK demodulated optical signal output from the DPSK demodulation circuit 3 when the center wavelength of a DPSK optical signal deviates from the optimal state shown in FIGS. 3A to 3D by 0.017 nm. FIG. 4A shows the optical waveform of the DPSK demodulated optical signal output from the output port P. FIG. 4B shows the optical waveform of the DPSK demodulated optical signal output from the port N. FIG. 4C shows the optical spectrum of the DPSK demodulated optical signal output from the output port P. FIG. 4D shows the optical spectrum of the DPSK demodulated optical signal output from the output port N. Referring to FIGS. 3A to 3D and 4A to 4D, as a DPSK optical signal, a 10.7-Gb/s RZ-DPSK signal is used.

FIGS. 4A and 4B show how the eye opening of an optical signal is closed. In consideration of the wavelength accuracy of a signal laser diode (not shown) which outputs a DPSK optical signal, the temperature dependence of the DPSK demodulation circuit 3, manufacturing variations, and the like, degradations like those shown in FIGS. 4A to 4D can occur without the execution of dynamic phase control on the DPSK demodulation circuit 3 with respect to the center wavelength of a DPSK optical signal.

In contrast to this, in the DPSK optical receiver according to this exemplary embodiment, the DPSK demodulation circuit 3 can be dynamically controlled in accordance with the center wavelength of a DPSK optical signal. This makes it possible to maintain the optimal reception state shown in FIGS. 3A to 3D and obtain good transmission quality.

Note that in the DPSK optical receiver according to this exemplary embodiment, the optical bandpass filter 7 is preferably a filter having a sufficiently narrow pass bandwidth relative to the bit rate of a DPSK optical signal, and preferably satisfies (3-db bandwidth of optical bandpass filter)≦(bit rate of transmission signal)×0.2.

Second Exemplary Embodiment

Figure 5:
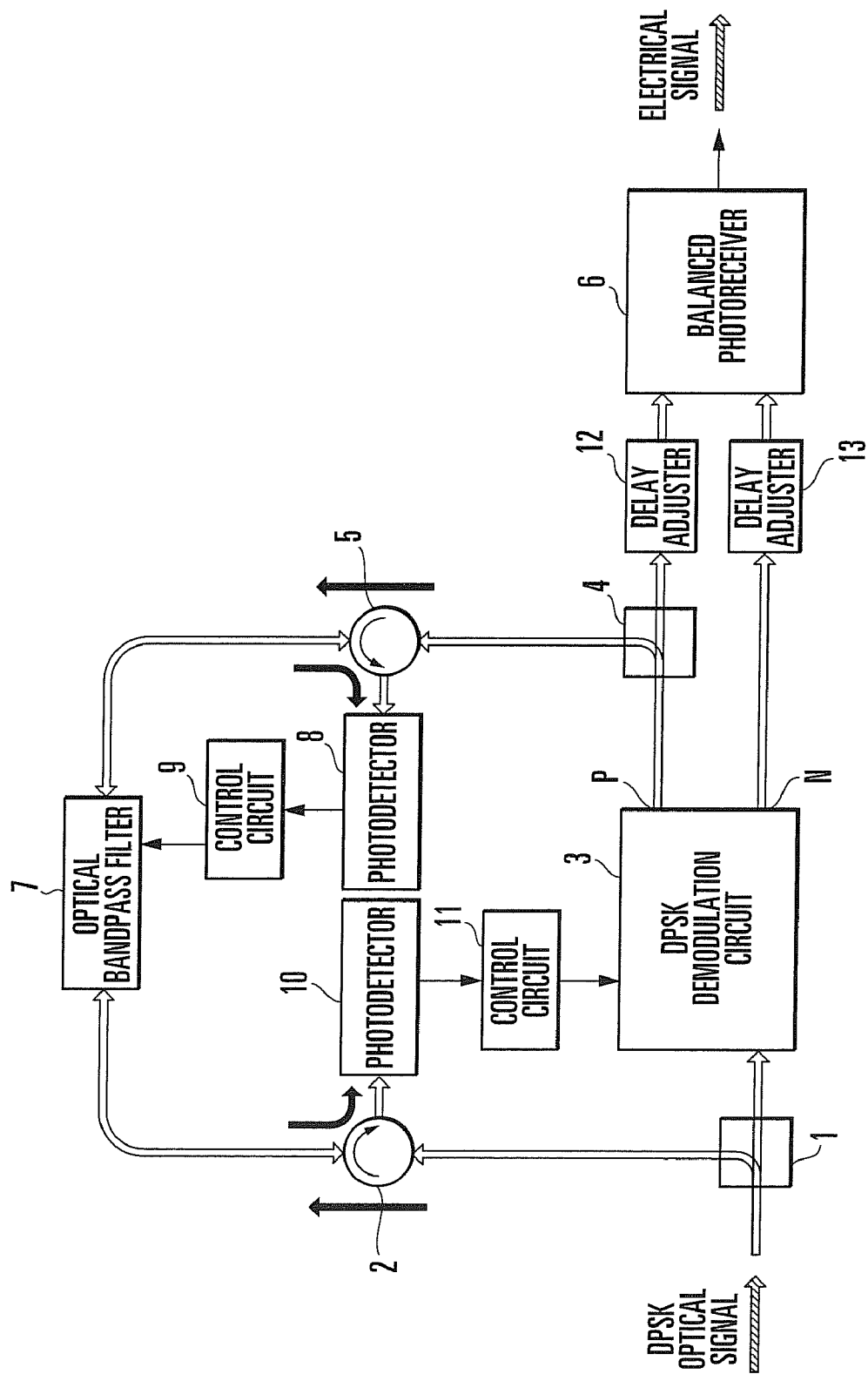
FIG. 5 is a block diagram showing the arrangement of a DPSK optical receiver according to the second exemplary embodiment of the present invention.

The second exemplary embodiment of the present invention will be described next. FIG. 5 shows the arrangement of a DPSK optical receiver according to the second exemplary embodiment of the present invention. The same reference numerals as in FIG. 1 denote the same components in FIG. 5.

The DPSK optical receiver according to this exemplary embodiment includes a first delay adjuster (first delay adjustment means) 12 capable of adjusting the delay amount of light between an output port P of a DPSK demodulation circuit 3 and a balanced photoreceiver 6 and a second delay adjuster (second delay adjusting means) 13 capable of adjusting the delay amount of light between an output port N of the DPSK demodulation circuit 3 and the balanced photoreceiver 6, in addition to the components shown in FIG. 1.

In this exemplary embodiment, adding the delay adjusters 12 and 13 can compensate for a delay amount due to a photocoupler 4 connected to the output port P and can match the input timings of the DPSK demodulated optical signal output from the output port P and of the DPSK demodulated optical signal output from the output port N to the balanced photoreceiver 6.

Third Exemplary Embodiment

Figure 6:
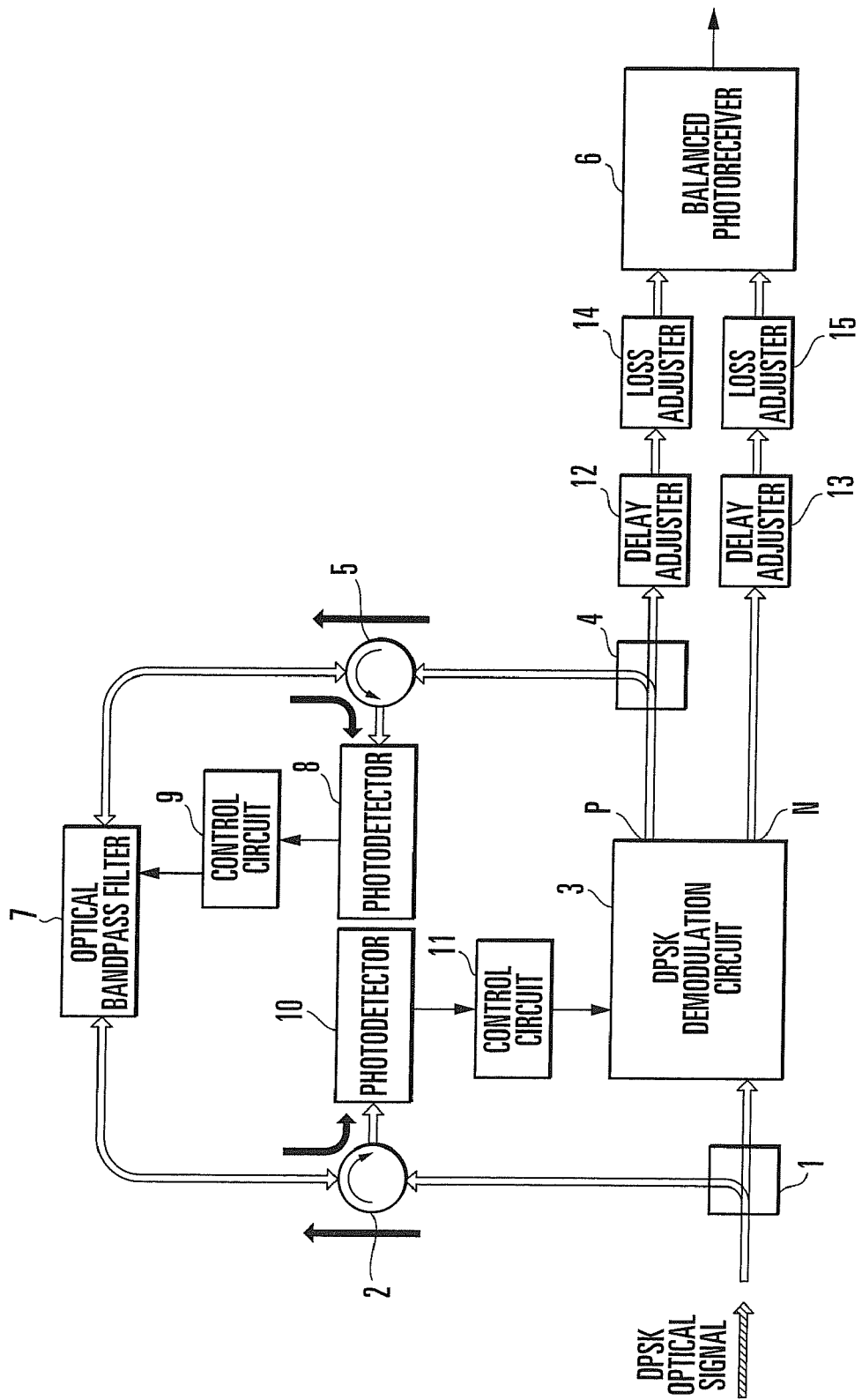
FIG. 6 is a block diagram showing the arrangement of a DPSK optical receiver according to the third exemplary embodiment of the present invention.

The third exemplary embodiment of the present invention will be described next. FIG. 6 shows the arrangement of a DPSK optical receiver according to the third exemplary embodiment of the present invention. The same reference numerals as in FIGS. 1 and 5 denote the same components.

The DPSK optical receiver according to this exemplary embodiment includes a first loss adjuster (first loss adjustment means) 14 capable adjusting the amount of loss of light between an output port P of a DPSK demodulation circuit 3 and a balanced photoreceiver 6 and a second loss adjuster (second loss adjustment means) 15 capable of adjusting the amount of loss of light between an output port N of the DPSK demodulation circuit 3 and the balanced photoreceiver 6, in addition to the components shown in FIG. 5.

In this exemplary embodiment, adding the loss adjusters 14 and 15 can compensate for optical loss due to a photocoupler 4 connected to the output port P and can suppress variations in optical power level between the DPSK demodulated optical signal output from the output port P and of the DPSK demodulated optical signal output from the output port N.

Fourth Exemplary Embodiment

Figure 7:
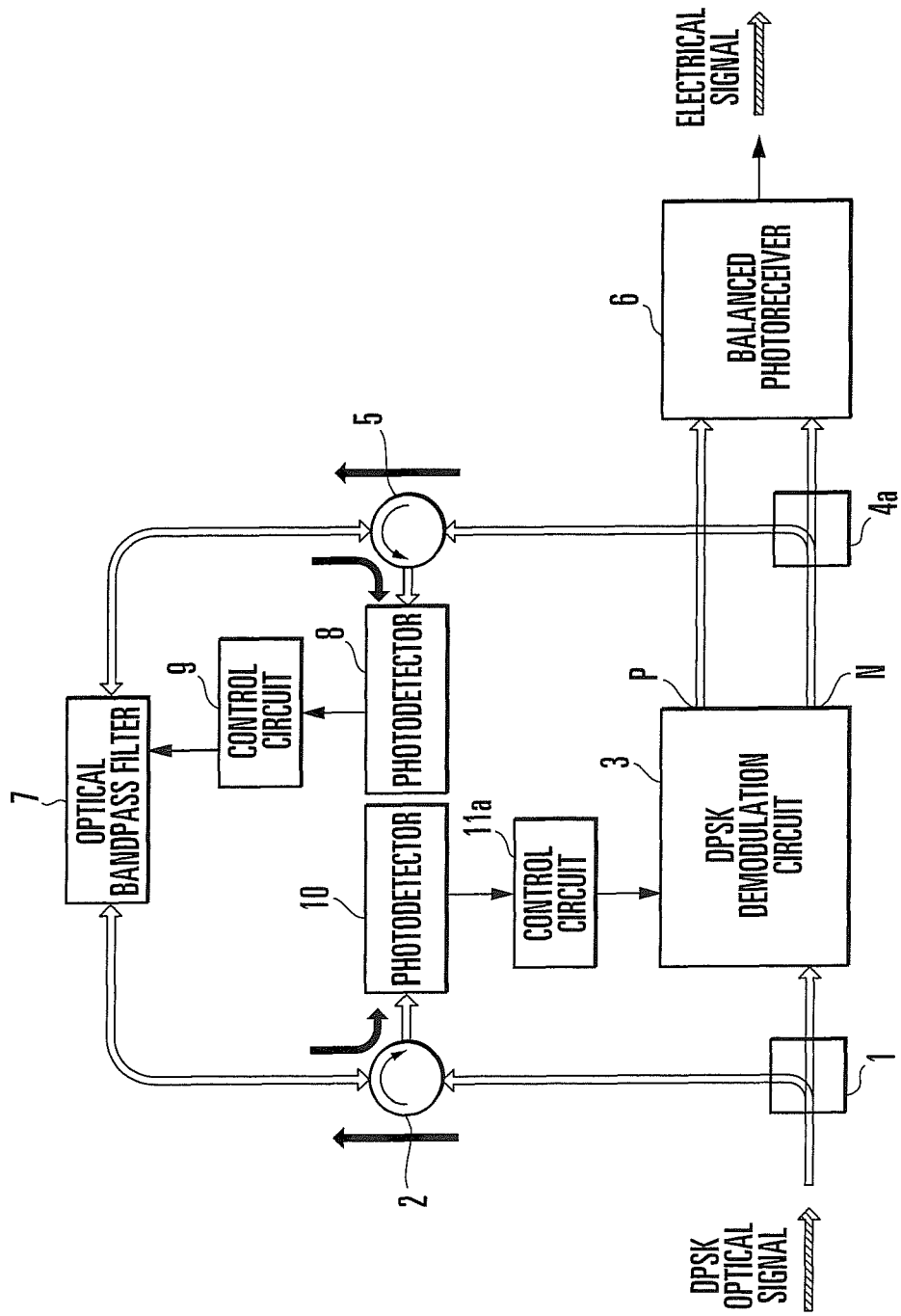
FIG. 7 is a block diagram showing the arrangement of a DPSK optical receiver according to the fourth exemplary embodiment of the present invention.

The fourth exemplary embodiment of the present invention will be described next. FIG. 7 shows the arrangement of a DPSK optical receiver according to the fourth exemplary embodiment of the present invention. The same reference numerals as in FIG. 1 denote the same components in FIG. 7.

The DPSK optical receiver according to this exemplary embodiment includes a photocoupler (optical branching means) 4a connected to an output port N of a DPSK demodulation circuit 3 instead of the photocoupler 4 connected to the output portion P of the two-system output ports P and N of the DPSK demodulation circuit 3 as in the arrangement shown in FIG. 1.

In this exemplary embodiment, the DPSK demodulated optical signal output of positive logic from the output port P of the DPSK demodulation circuit 3 is directly applied to the positive logic port of a balanced photoreceiver 6. On the other hand, part of the DPSK demodulated optical signal of negative logic output from the output port N is branched by the photocoupler 4a and applied to an optical circulator 5. The remaining part of the DPSK demodulated optical signal is applied to the negative logic port of the balanced photoreceiver 6. The optical circulator 5 applies the DPSK demodulated optical signal from the photocoupler 4a to an optical bandpass filter 7. The optical bandpass filter 7 filters the DPSK demodulated optical signal in accordance with its center wavelength to extract part of the demodulated optical signal.

The DPSK demodulated optical signal filtered by the optical bandpass filter 7 is applied to an optical circulator 2. The optical circulator 2 applies the DPSK demodulated optical signal from the optical bandpass filter 7 to a photodetector 10. The photodetector 10 detects the optical power level of the applied DPSK demodulated optical signal. A first control circuit (first control means) 11a executes phase control on the DPSK demodulation circuit 3 so as to minimize the optical power level detected by the photodetector 10, thereby dynamically controlling the DPSK demodulation circuit 3 in accordance with the center wavelength of the DPSK optical signal applied to the DPSK demodulation circuit 3.

This exemplary embodiment can obtain the same effect as that of the first exemplary embodiment, and can greatly improve transmission quality degradation accompanying wavelength shift between the center wavelength of a DPSK optical signal and the DPSK demodulation circuit 3.

Fifth Exemplary Embodiment

Figure 8:
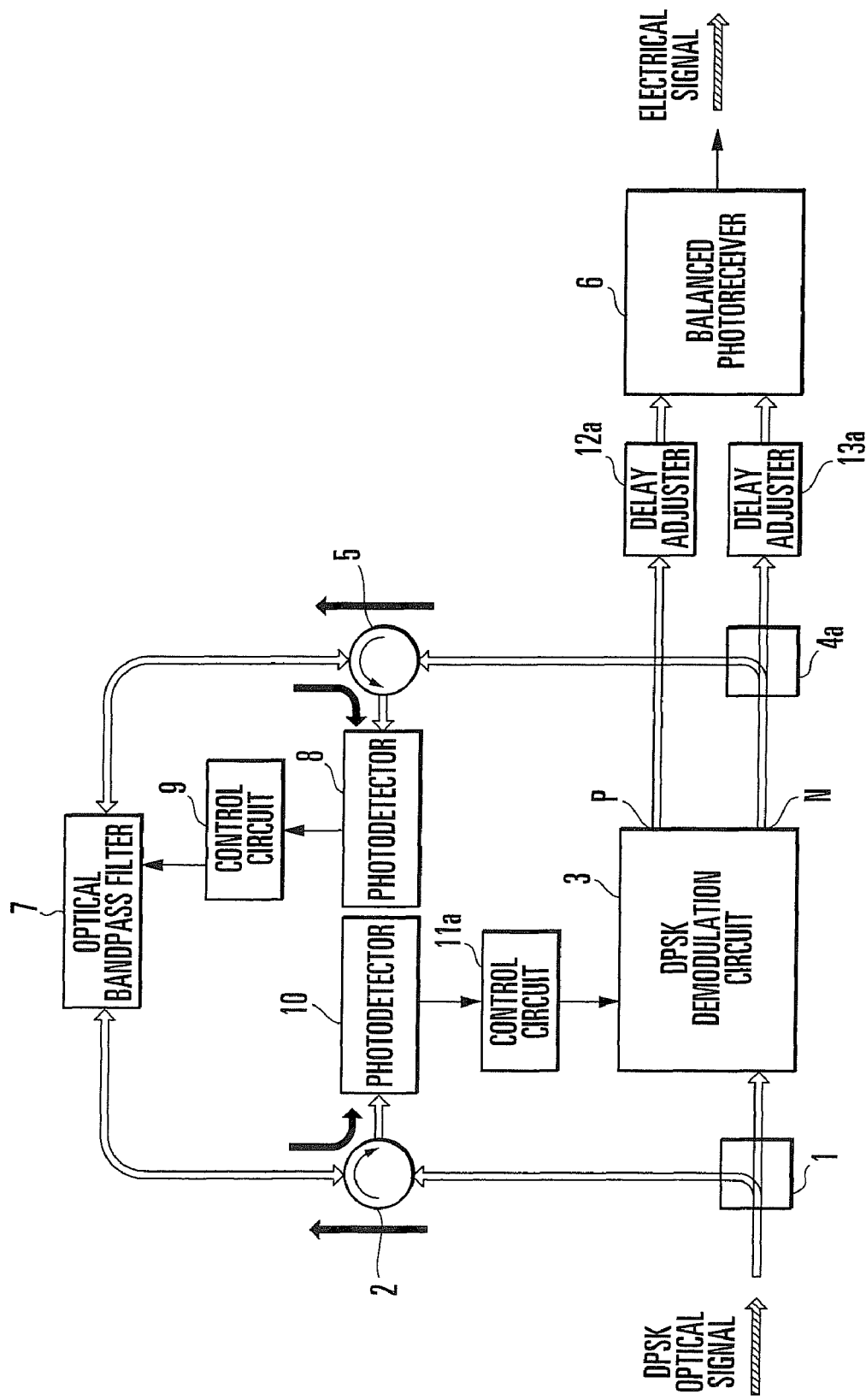
FIG. 8 is a block diagram showing the arrangement of a DPSK optical receiver according to the fifth exemplary embodiment of the present invention.

The fifth exemplary embodiment of the present invention will be described next. FIG. 8 shows the arrangement of a DPSK optical receiver according to the fifth exemplary embodiment of the present invention. The same reference numerals as in FIGS. 1 and 7 denote the same components.

The DPSK optical receiver according to this exemplary embodiment includes a first delay adjuster (first delay adjustment means) 12a capable of adjusting the delay amount of light between an output port P of a DPSK demodulation circuit 3 and a balanced photoreceiver 6 and a second delay adjuster (second delay adjustment means) 13a capable of adjusting the delay amount of light between an output port N of the DPSK demodulation circuit 3 and the balanced photoreceiver 6, in addition to the components shown in FIG. 7.

In this exemplary embodiment, adding the delay adjusters 12a and 13a can compensate for a delay amount due to a photocoupler 4a connected to the output port N and can match the input timings of the DPSK demodulated optical signal output from the output port P and of the DPSK demodulated optical signal output from the output port N to the balanced photoreceiver 6.

Sixth Exemplary Embodiment

Figure 9:
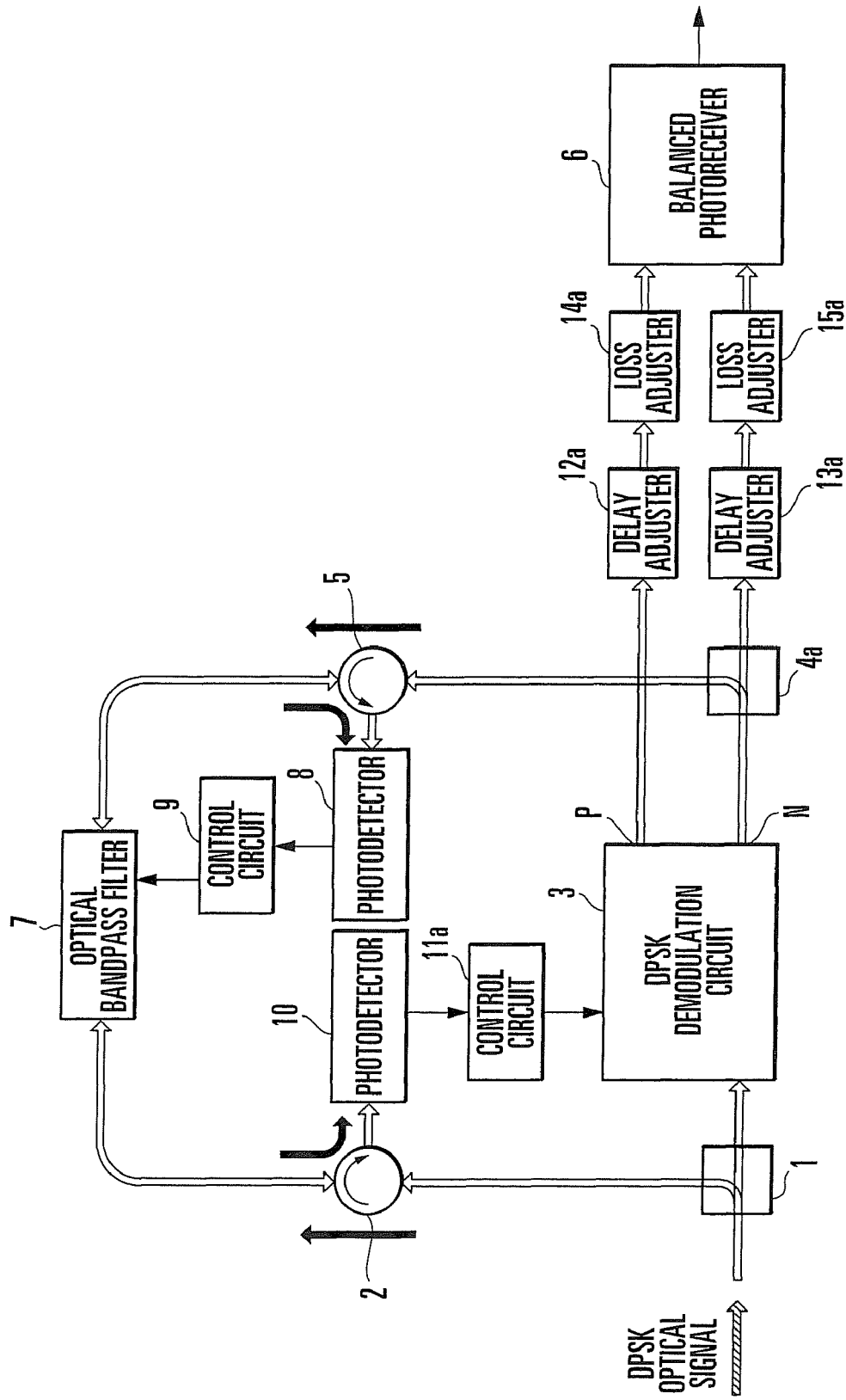
FIG. 9 is a block diagram showing the arrangement of a DPSK optical receiver according to the sixth exemplary embodiment of the present invention.

The sixth exemplary embodiment of the present invention will be described next. FIG. 9 shows the arrangement of a DPSK optical receiver according to the sixth exemplary embodiment of the present invention. The same reference numerals as in FIGS. 1, 7, and 8 denote the same components.

The DPSK optical receiver according to this exemplary embodiment includes a first loss adjuster (first loss adjustment means) 14a capable adjusting the amount of loss of light between an output port P of a DPSK demodulation circuit 3 and a balanced photoreceiver 6 and a second loss adjuster (second loss adjustment means) 15a capable of adjusting the amount of loss of light between an output port N of the DPSK demodulation circuit 3 and the balanced photoreceiver 6, in addition to the components shown in FIG. 8.

In this exemplary embodiment, adding the loss adjusters 14a and 15a can compensate for optical loss due to a photocoupler 4a connected to the output port N and can suppress variations in optical power level between the DPSK demodulated optical signal output from the output port P and of the DPSK demodulated optical signal output from the output port N.

Figure 10:
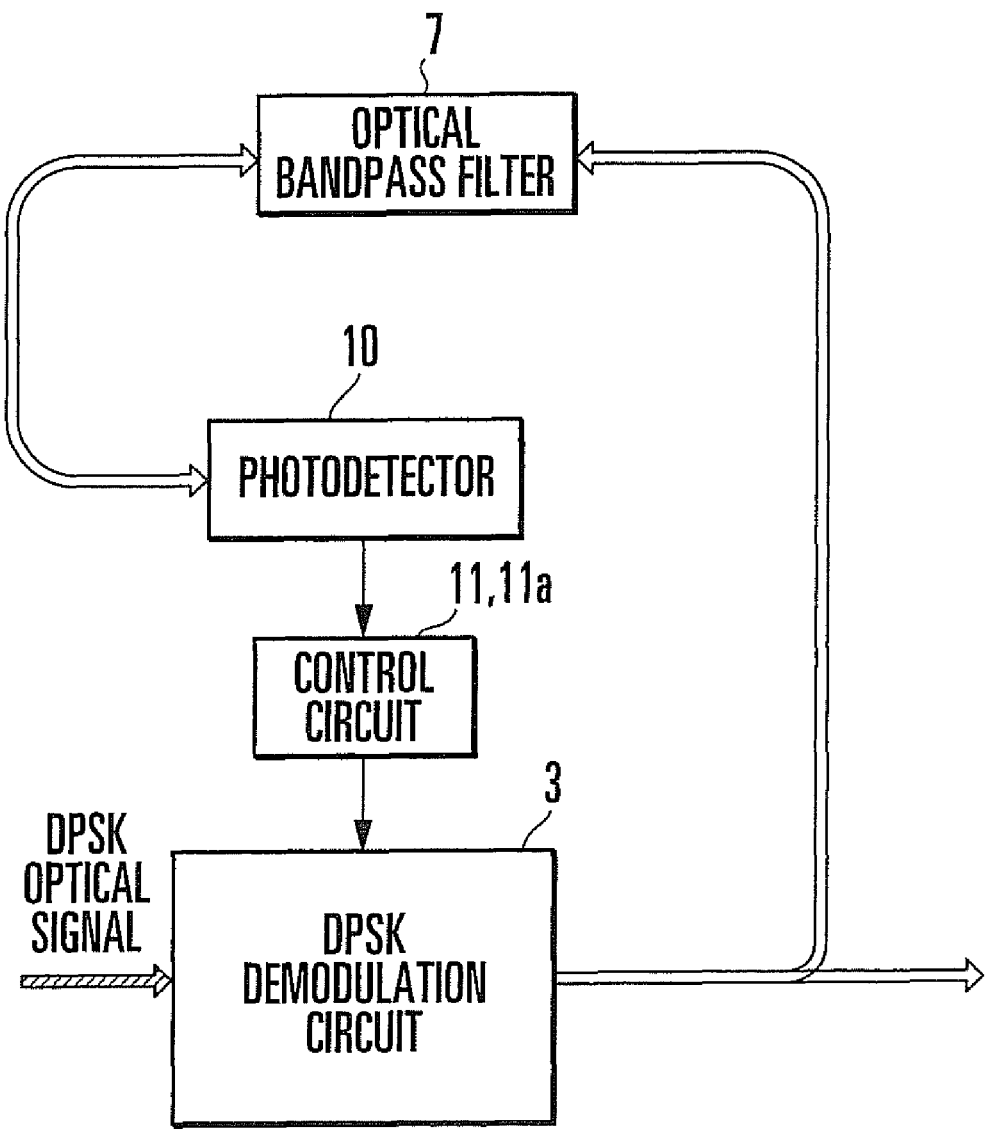
FIG. 10 is a block diagram showing an example of the arrangement of principal part of the present invention.

Each exemplary embodiment described above has exemplified the case in which the optical bandpass filter 7 and the DPSK demodulation circuit 3 are simultaneously controlled in accordance with the center wavelength of a DPSK optical signal. However, it is not always necessary to control the optical bandpass filter 7 in accordance with the center wavelength of a DPSK optical signal. That is, as shown in FIG. 10, if the DPSK optical receiver includes the DPSK demodulation circuit 3, the optical bandpass filter 7, the photodetector 10, and the control circuit 11 or 11a, the problem of the present invention can be solved.

The optical bandpass filter 7, the photodetector 10, and the control circuit 11 or 11a can implement two functions, i.e., the function of detecting the center wavelength of a DPSK optical signal and the function of controlling the DPSK demodulation circuit 3 in accordance with the detected center wavelength. As a result, the DPSK optical receiver shown in FIG. 10 can maximize the eye opening of a DPSK demodulated optical signal and can avoid a data polarity error at the time of DPSK demodulation. This makes it possible to greatly improve transmission quality degradation accompanying the wavelength shift between the center wavelength of a DPSK optical signal and the DPSK demodulation circuit. It is also possible to improve the reception sensitivity characteristic.

Note that the present invention can be applied to an optical receiver in an optical transmission system based on the DPSK modulation scheme.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A DPSK optical receiver comprising:
a DPSK demodulation circuit which demodulates a DPSK optical signal and outputs the DPSK demodulated optical signal;
an optical bandpass filter which extracts a demodulated optical signal near a center wavelength from the DPSK demodulated optical signal output from said DPSK demodulation circuit;
a first photodetector which detects an optical power level of the DPSK demodulated optical signal extracted by said optical bandpass filter;
a first control circuit which performs phase control on said DPSK demodulation circuit so as to optimize said DPSK demodulation circuit with respect to the center wavelength of the DPSK optical signal on the basis of the optical power level detected by said first photodetector;
an optical coupler which is provided between said DPSK demodulation circuit and said optical bandpass filter, branches part of one of two-system DPSK demodulated optical signals output from said DPSK demodulation circuit, and applies the part of the DPSK demodulated optical signal to said optical bandpass filter;
a first delay adjuster which adjusts a delay amount of one DPSK demodulated optical signal output from said DPSK demodulation circuit; and
a second delay adjuster which adjusts a delay amount of the other DPSK demodulated optical signal output from said DPSK demodulation circuit.

2. A receiver according to claim 1, further comprising:
a second photodetector which detects an optical power level of an optical signal near a center wavelength extracted from a DPSK optical signal; and
a second control circuit which controls a center wavelength of said optical bandpass filter so as to maximize the optical power level detected by said second photodetector,
wherein said bandpass filter extracts an optical signal near a center wavelength from a DPSK optical signal and outputs the optical signal to said second photodetector.

3. A receiver according to claim 1, further comprising:
an optical coupler which is provided between said DPSK demodulation circuit and said optical bandpass filter, branches part of one of two-system DPSK demodulated optical signals output from said DPSK demodulation circuit, and applies the part of the DPSK demodulated optical signal to said optical bandpass filter;
a first loss adjuster which adjusts a loss of one DPSK demodulated optical signal output from said DPSK demodulation circuit; and
a second loss adjuster which adjusts a loss of the other DPSK demodulated optical signal output from said DPSK demodulation circuit.

4. A DPSK optical receiver comprising:
DPSK demodulation means for demodulating a DPSK optical signal and outputting the DPSK demodulated optical signal;
optical extraction means for extracting a demodulated optical signal near a center wavelength from the DPSK demodulated optical signal output from said DPSK demodulation means;
first photodetection means for detecting an optical power level of the DPSK demodulated optical signal extracted by said optical extraction means;
first control means for performing phase control on said DPSK demodulation means so as to optimize said DPSK demodulation means with respect to the center wavelength of the DPSK optical signal on the basis of the optical power level detected by said first photodetection means;
an optical coupling means, which is provided between said DPSK demodulation circuit and said optical bandpass filter, for branching part of one of two-system DPSK demodulated optical signals output from said DPSK demodulation circuit, and for applying the part of the DPSK demodulated optical signal to said optical bandpass filter;
a first delay adjusting means for adjusting a delay amount of one DPSK demodulated optical signal output from said DPSK demodulation means; and
a second delay adjusting means for adjusting a delay amount of the other DPSK demodulated optical signal output from said DPSK demodulation means.

* * * * *